United States Patent
El-Essawy et al.

(10) Patent No.: US 7,657,729 B2
(45) Date of Patent: Feb. 2, 2010

(54) EFFICIENT MULTIPLE-TABLE REFERENCE PREDICTION MECHANISM

(75) Inventors: Wael R. El-Essawy, Austin, TX (US); Ramakrishnan Rajamony, Austin, TX (US); Hazim Shafi, Redmond, WA (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 11/457,178

(22) Filed: Jul. 13, 2006

(65) Prior Publication Data

US 2008/0016330 A1    Jan. 17, 2008

(51) Int. Cl.
*G06F 9/00*    (2006.01)
(52) U.S. Cl. ....................................... 712/240
(58) Field of Classification Search ................... 712/240
See application file for complete search history.

(56) References Cited

U.S. PATENT DOCUMENTS 5,941,981 A * 8/1999 Tran ........................... 712/207
6,986,027 B2 * 1/2006 Barowski et al. ............ 712/240

* cited by examiner

*Primary Examiner*—Eddie P Chan
*Assistant Examiner*—John Lindlof
(74) *Attorney, Agent, or Firm*—Dillon & Yudell LLP

(57) ABSTRACT

A method and an apparatus for enabling a prefetch engine to detect and support hardware prefetching with different streams in received accesses. Multiple (simple) history tables are provided within (or associated with) the prefetch engine. Each of the multiple tables is utilized to detect different access patterns. The tables are indexed by different parts of the address and are accessed in a preset order to reduce the interference between different patterns. When an address does not fit the patterns of a first table, the address is passed to the next table to be checked for a match of different patterns. In this manner, different patterns may be detected at different tables within a single prefetch engine.

15 Claims, 5 Drawing Sheets

EFFICIENT MULTIPLE-TABLE REFERENCE PREDICTION MECHANISM

GOVERNMENT RIGHTS

This invention was made with Government support under Agreement No. NBCH30390004 with the United States Defense Advanced Research Projects Agency (DARPA). The U.S. Government has certain rights to this invention.

BACKGROUND OF THE INVENTION

1. Technical Field

The present invention relates generally to data processing and more particularly to prefetching data for utilization during data processing. Still more particularly, the present invention relates to a method and system for prefetching data having multiple patterns.

2. Description of Related Art

Prefetching of data for utilization within data processing operations is well-known in the art. Conventional computer systems are designed with a memory hierarchy comprising different memory devices with increasing access latency the further the device is away from the processor. These conventionally-designed processors typically operate at a very high speed and are capable of processing data at such a fast rate that it is necessary to prefetch a sufficient number of cache lines of data from lower level caches (and/or system memory). This prefetching ensures that the data is ready and available for use by the processor.

Data prefetching is a proven, effective way to hide increasing memory latency from the processor's execution units. Conventional systems utilize either a software prefetch method (software prefetching) and/or a hardware implemented prefetch method (hardware prefetching). Software prefetching schemes rely on the programmer/compiler to insert prefetch instructions within the program execution code. Hardware prefetching schemes, in contrast, rely on special hardware to detect patterns in data accesses and responsively generate and issue prefetch requests according to the detected pattern. Because hardware prefetching does not incur instruction overhead and is able to dynamically adapt to program behavior, many hardware prefetching techniques have been proposed over the years. Most of these hardware techniques have shown great success in detecting certain types of access patterns, in particular sequential accesses.

Conventional hardware prefetching schemes utilize history tables to detect patterns. These tables save a number of past accesses and are indexed either by instruction address (i.e., program counter (PC)) or data address. Indexing using PCs works only for streams accessed within loops. However, as compilers continue to perform aggressive optimizations such as loop unrolling, which results in a stream being accessed through multiple instructions, such indexing is becoming less and less attractive.

When indexed by data address, a history table is able to save either virtual addresses or physical addresses. Saving virtual addresses can predict streams across multiple pages but requires accessing the page translation hardware to translate virtual addresses to physical addresses. Because the page translation hardware is in the critical path of the instruction pipeline, significant hardware overhead is required to allow prefetch requests to access the page translation hardware without slowing down the whole pipeline. Consequently, most (and perhaps all) prefetch engines in commercial systems, such as Intel Pentium™ and Xeon™, AMD Athlon™ and Opteron™, Sun UltraSPARC III™, and IBM POWER4™ and POWER5™, are indexed by physical addresses and store physical addresses.

In data operations, several types of stream patterns exist, and each requires a different scheme to detect the particular pattern. These different patterns can be sequential unit stride pattern, non-unit stride pattern, and pointer chasing, among others. Current systems are designed to perform well only on some of these patterns. However, no existing scheme is able to efficiently work on all patterns and typically systems are designed to track only one pattern. Also, all existing systems operate with a single history table for detecting patterns from the tracked requests.

Thus, because of the difficulty of detecting multiple patterns using one table, the prefetch engines of all of the above listed real systems are able to detect only sequential streams (i.e., unit-stride streams) or in some instances small non-unit stride streams. Researchers in the industry have proposed utilizing a complicated history table with a complicated state machine to detect odd access patterns in physical addresses. However the complexity of these designs prevents the designs from being adopted into a real system.

Thus, the prefetch engines of the conventional systems are unable to provide support for more than one of the common patterns in data prefetch operations. Further, there is no existing prefetch scheme that is able to detect both unit and non-unit stride streams without incurring a substantial hit with respect to chip area and additional cost due to the required hardware complexity.

SUMMARY OF THE INVENTION

Disclosed are a method and an apparatus for enabling a prefetch engine to detect and support hardware prefetching for streams with different patterns. Multiple (simple) history tables are provided within (or associated with) the prefetch engine. Each of the multiple tables is utilized to detect different access patterns. The tables are indexed by different parts of the program counter, or the virtual address, or the physical address and are accessed in a preset order to reduce the interference between different patterns. In one particular embodiment, when an address does not fit the simple pattern of a first table, the address is passed to the next table to be checked for a match of the large stride pattern. In this manner, multiple different stride patterns may be detected utilizing the multiple tables.

In one embodiment utilizing two history tables, a first table is utilized to detect unit and small, non-unit stride streams; and a second table is utilized to detect large, non-unit stride streams. These two tables are indexed by different bits of the physical address. When an address is encountered, the first table is initially accessed. If the prefetch logic does not detect a stride within the first table, then the address is passed/forwarded to the second table and the prefetch logic checks the second table to detect a stride, which would be large, if any. Thus, in general, only accesses that do not belong to the first table get passed to the second table, and so on, until the last table in the ordered sequence of tables is checked. The sequential checking of tables eliminates the likelihood of interference between different patterns and also enables each table to be a simple design.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and an apparatus for enabling a prefetch engine to detect and support hardware prefetching with different patterns, such as both unit and non-unit stride streams, in both virtual and physical address accesses. Multiple (simple) history tables are provided within (or associated with) the prefetch engine. Each of the multiple tables is utilized to detect different access patterns. The tables are indexed by different parts of the physical address and are accessed in a preset order to reduce the interference between different patterns. When the detected stream does not fit the patterns of a first table, the stream is passed to the next table and subsequent tables to be checked for a match of different patterns of the second table and subsequent tables until to the last table in the sequence. In this manner, multiple different patterns may be detected utilizing the multiple tables.

Figure 1:
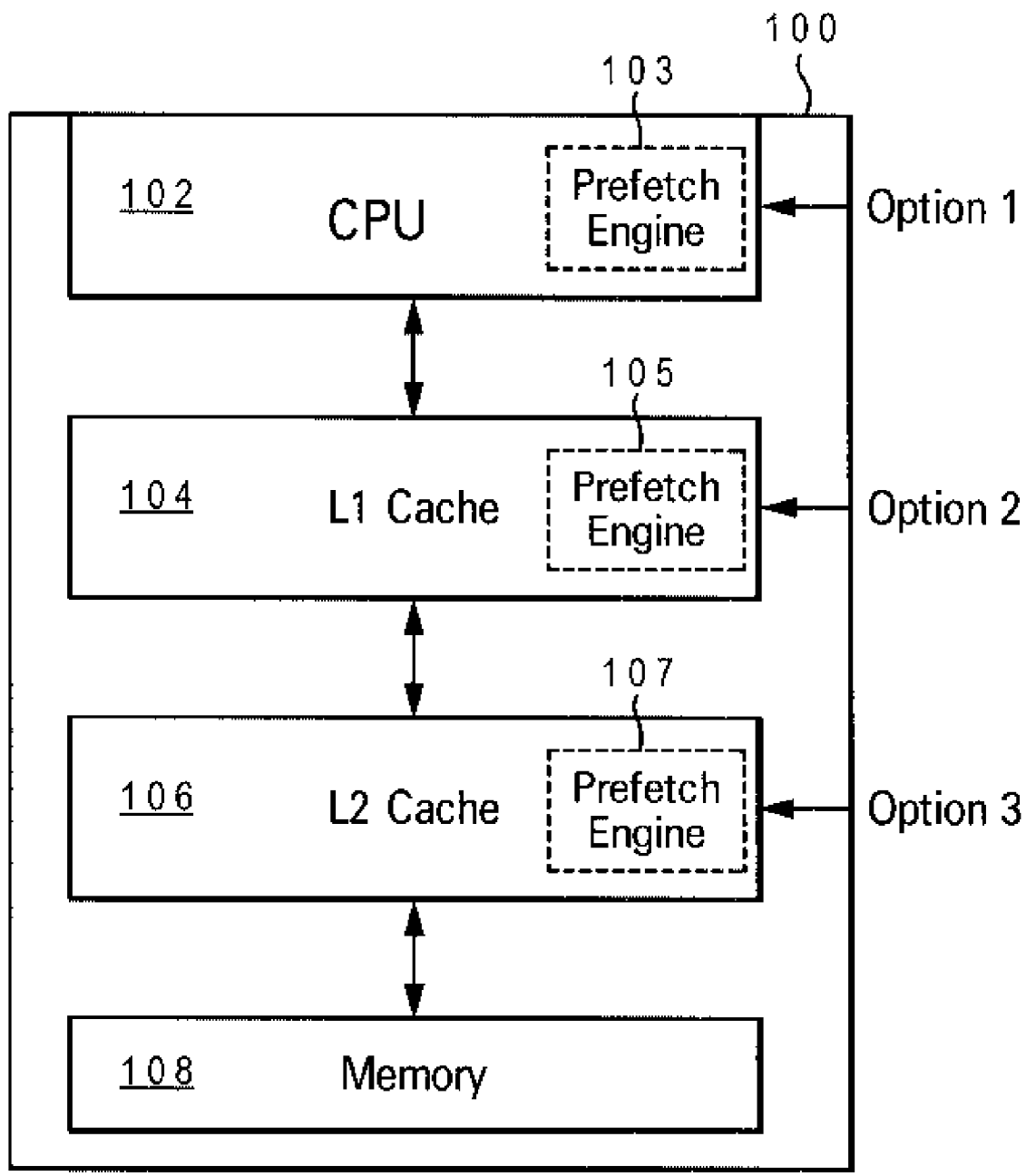
FIG. 1 is a block diagram of a data processing system designed with prefetch engines, within which embodiments of the present invention may be practiced.

Referring now to the drawings and in particular to FIG. 1, there is depicted a block diagram of an example data processing system, within which the various features of the invention may be implemented, in accordance with one embodiment of the present invention. Data processing system 100 comprises at least one central processing unit (CPU) 102 which is connected via a series of buses/channels (not specifically shown) to a memory hierarchy that includes multiple levels of caching: L1 cache 104, L2 cache 106 and memory 108. CPU 102 includes various execution units, registers, buffers, and other functional units, which are all formed by integrated circuitry. In one embodiment of the present invention, CPU 102 is one of the PowerPC™ lines of microprocessors, which operates according to reduced instruction set computing (RISC) techniques. CPU 102 communicates with each of the above devices within the memory hierarchy by various means, including a bus or a direct channel.

Also illustrated within each of CPU 102 and L1 104 and L2 caches 106 of FIG. 1 are respective prefetch engines (PE) 103, 105, 107, within which logic is provided to enable the various features of the invention, as described in details below. Each PE 103/105/107 predicts future data references and issues prefetch requests for the predicted future data references. As shown, PE 103 may be included within (or associated with) the CPU, and in one embodiment, the CPU's PE 103 may issue prefetch requests to all levels of caches. Alternatively, in another embodiment, different PEs 105/107 may be included within (or associated with) each individual cache, issuing prefetch requests for only the associated cache. This embodiment applies to all three options illustrated by FIG. 1.

As utilized herein, the terms prefetch/prefetching refer to the method by which data that is stored in one memory location of the memory hierarchy (i.e., lower level caches 106 or memory 108) is transferred to a higher level memory location that is closer (yields lower access latency) to the CPU processor, before the data is actually needed/demanded by the processor. More specifically, prefetching as described hereinafter, refers to the early retrieval of data from one of the lower level caches/memory to a higher level cache or the CPU (not shown) before the CPU 102 issues a demand for the specific data being returned. Lower level caches may comprise additional levels, which would then be sequentially numbered, e.g., L3, L4. In addition to the illustrated memory hierarchy, data processing system 100 may also comprise additional storage devices that form a part of memory hierarchy from the perspective of CPU 102. Storage device may be one or more electronic storage media such as a floppy disk, hard drive, CD-ROM, or digital versatile disk (DVD). Storage device may also be the cache, memory, and storage media of another CPU in a multiprocessor system.

Those skilled in the art will further appreciate that there are other components that might be utilized in conjunction with those shown in the block diagram of FIG. 1; for example, cache controller(s) and a memory controller may be utilized as interfaces between lower level caches 104/106 and memory device 108 and CPU 102, respectively. While a particular configuration of data processing system 100 is illustrated and described, it is understood that other configurations may be possible, utilizing similarly featured components within a processor to achieve the same functional results, and it is contemplated that all such configurations fall within the scope of the present invention.

Also, while an illustrative embodiment of the present invention has been, and will continue to be, described in the context of a fully functional data processing system, those skilled in the art will appreciate that software aspects of an illustrative embodiment of the present invention are capable of being distributed as a program product in a variety of forms, and that an illustrative embodiment of the present invention applies equally regardless of the particular type of signal bearing media used to actually carry out the distribution.

Figure 2:
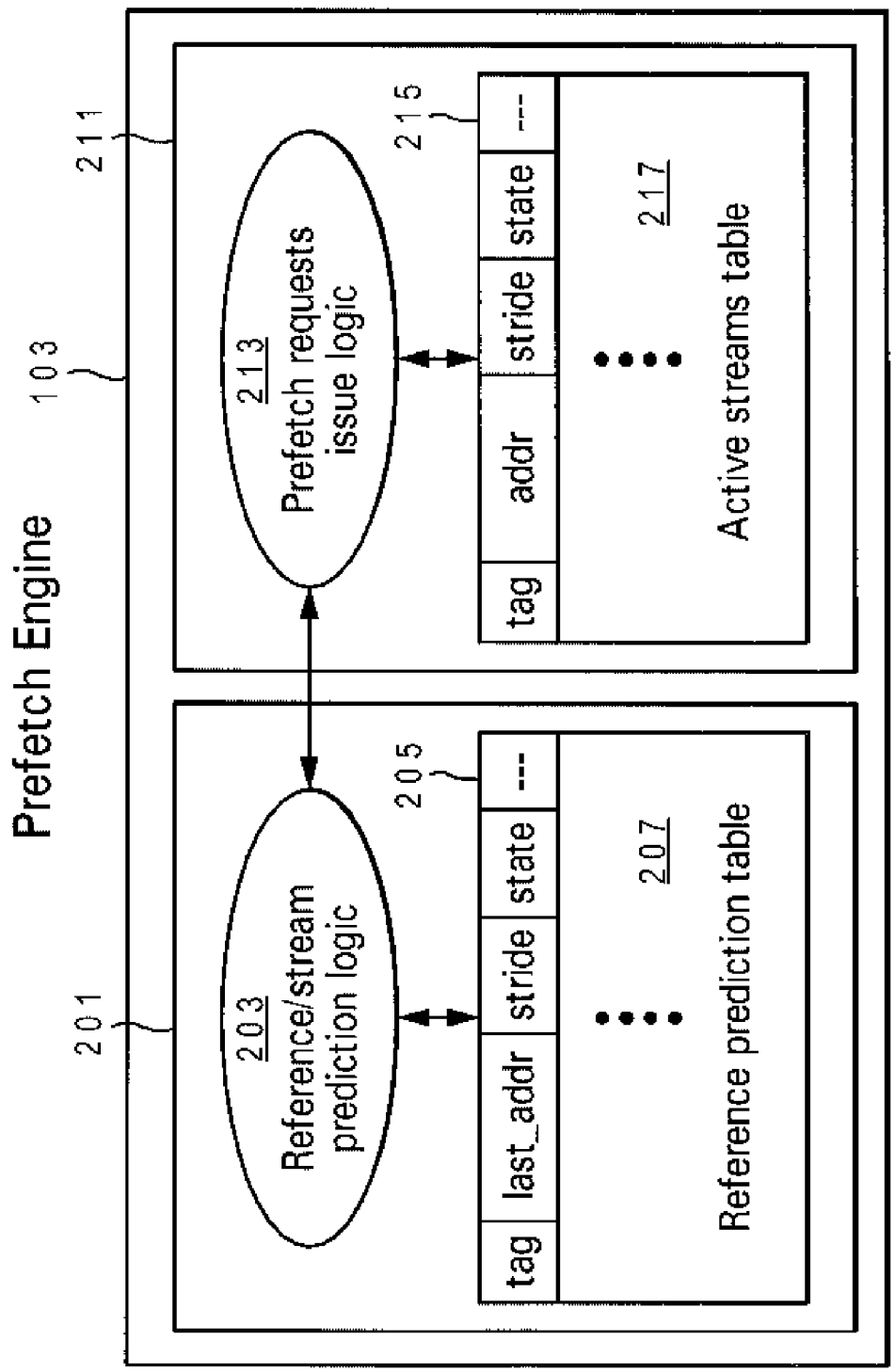
FIG. 2 is a block diagram depicting internal components of the prefetch engine in accordance with one embodiment of the present invention.

Turning now to FIG. 2, there is illustrated a block diagram of a PE (e.g., PE 103/105/107), which is configured with operating logic to enable the features of the inventions, according to the illustrative embodiment of the present invention. In the depicted embodiment, PE 103 comprises two main parts, namely reference prediction unit 201 and prefetch request issue unit 211. FIG. 2 shows a conventional system with one reference prediction table 207 and one active streams table 217. Within the reference prediction table 207 are one or more entries of historical data 205 of previous references. Within the active streams table 217 are one or more entries of active streams information 215.

Also illustrated within reference prediction table 207 is reference/stream prediction logic 203, which is utilized to predict future references based on issued references. Further, within active streams table 217 is prefetch request issue logic 213, which is utilized to send out prefetch requests at appropriate times. Both logic components represent the two primary components of the PE 103. Extra logic/table may be added to the reference/stream prediction logic 203 in order to enable the functionality of the multiple history table implementation described herein.

In conventional systems, the reference/stream prediction logic utilizes one table to store a certain number of previous references in each entry and initiate an active stream in the issue logic if some pattern is detected. Different types of applications exhibit different access patterns, and in conventional applications, a few different kinds of tables have been proposed to detect different types of access patterns. However, there is no one table that is able to work efficiently for all access patterns.

Unlike the conventional prefetch engines, PE 103 and Reference/Stream prediction logic 203 are configured with additional logic. Additionally, the present invention provides additional history tables that are ordered for sequential access based on a check of simpler patterns at the first and more complicated patterns at subsequent tables in the sequence. The functionality provided by the invention enables the data prefetch mechanisms within PE 103 to simultaneously support multiple patterns with very little additional hardware or cost to the overall system.

Figure 3:
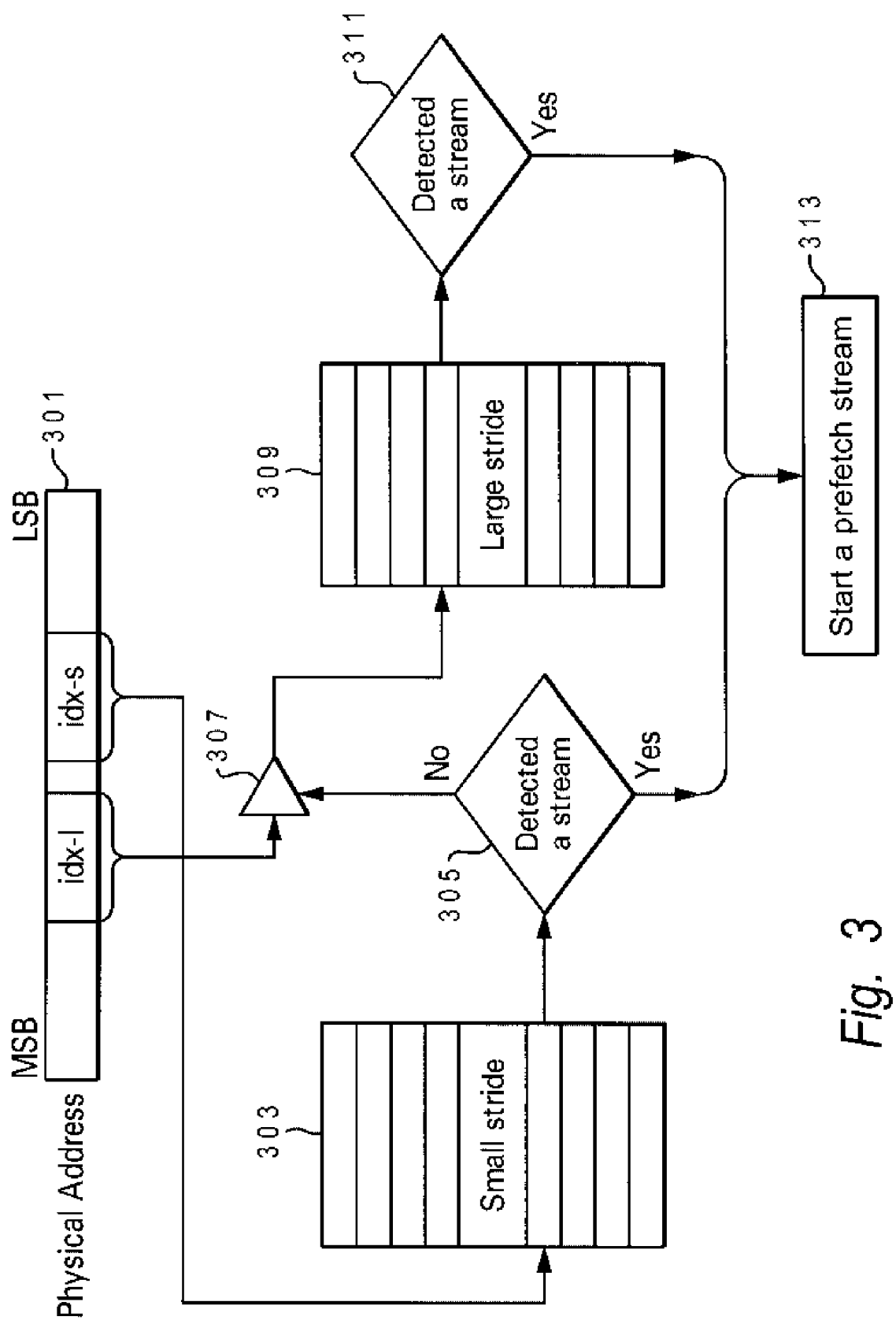
FIG. 3 is a logic flow diagram illustrating the processing of stream patterns through a prefetch engine with two history tables in accordance with one embodiment of the invention.

FIG. 3 provides a logic flow diagram of a two-table stride prediction algorithm, according to one embodiment. Two history tables are provided, a first "simple pattern" table 303 is utilized to detect unit and small, non-unit stride streams; and a second "large stride" table 309 is utilized to detect large, non-unit stride streams. In the described embodiment, both of these tables 303 and 309 are organized as set-associative caches and indexed by certain bits of physical address 301.

Within the illustration, physical address is depicted having a "Least Significant Bit" (LSB) and a "Most Significant Bit" (MSB). The illustration thus assumes a big endian machine, although the features of the invention are fully applicable to a little endian machine as well. Within the Physical address 301 are index bits, namely idx-l and idx-s, which respectively represent the index for the large stride table and the simple pattern table. The large stride table is indexed by bits within "idx-l", which includes more significant bits than "idx-s". In an embodiment having more than two history tables, additional indices are provided to access the specific tables.

The value of "idx-s" and "idx-l" basically determine how large a region to check for access patterns. Using different bits enables the prefetch engine to look into small regions for unit and small non-unit strides and to look into large regions for large strides. Use of different bits also avoids the interferences among simple patterns, and between simple patterns and large strides. This avoidance of interference then enables the PE to successfully detect both simple pattern and large stride streams.

As an example, assuming that "idx-s" begins at the $12^{th}$ least significant bit and "idx-l" begins at the $20^{th}$ least significant bit, the logic within the prefetch engine checks each 4-kilobyte region for simple patterns and then each 1-megabyte region for large strides. With this configuration of the physical address, the logic of the PE will successfully detect address sequence 0x0, 0x80, 0x1000, 0x1080, 0x2000, 0x2080, ... as two streams (1) 0x0, 0x1000, 0x2000, ..., and (2) 0x80, 0x1080, 0x2080, ..., with a stride of 0x1000 for both streams. On the contrary, a one-table mechanism will not be able to detect either of the two streams. The two-table prefetch engine will also detect address sequence 0x0, 0x20000, 0x1, 0x30000, 0x2, 0x40000, ... as two streams (1) 0x0, 0x1, 0x2, ... and (2) 0x20000, 0x30000, 0x40000, ..., with stride of 0x1 and 0x10000 respectively, while a conventional one-table prefetch engine can detect only one stream, 0x0, 0x1, 0x2, ....

According to the illustrated logic of FIG. 3, when the prefetch engine receives an address, the logic of PE utilizes bits within "idx-s" to index into the small stride table 303. If the stream detection logic detects (at block 305) that the physical address is part of a stream within the small stride table 303, a prefetch stream will be initiated as shown at block 313. Also, when the stream is detected within the small stride table 303, the select input to the large stride selection logic 307 prevents the address from being forwarded to the large stride table 309. However, if the logic does not detect a stream within the small stride table 303, the address is forwarded to the large stride table 309. If a stream is detected at the large stride table (at block 311), a prefetch stream will be initiated as shown at block 313.

Thus, when an address is received, the first table (with lower significant index bits) in the ordered sequence of tables is initially accessed. If the prefetch logic does not detect a stride within the first table, then the address is passed/forwarded to the second table (with higher significant index bits) and the prefetch logic checks the second table to detect a stride, which would be larger, if any. Thus, only accesses that do not belong to the first table ever get passed to the second table, and so on, until the last table in the ordered sequence of tables is checked. The sequential checking of tables eliminates the likelihood of interference between different patterns and also enables each table to be a simple yet efficient design.

Figure 4:
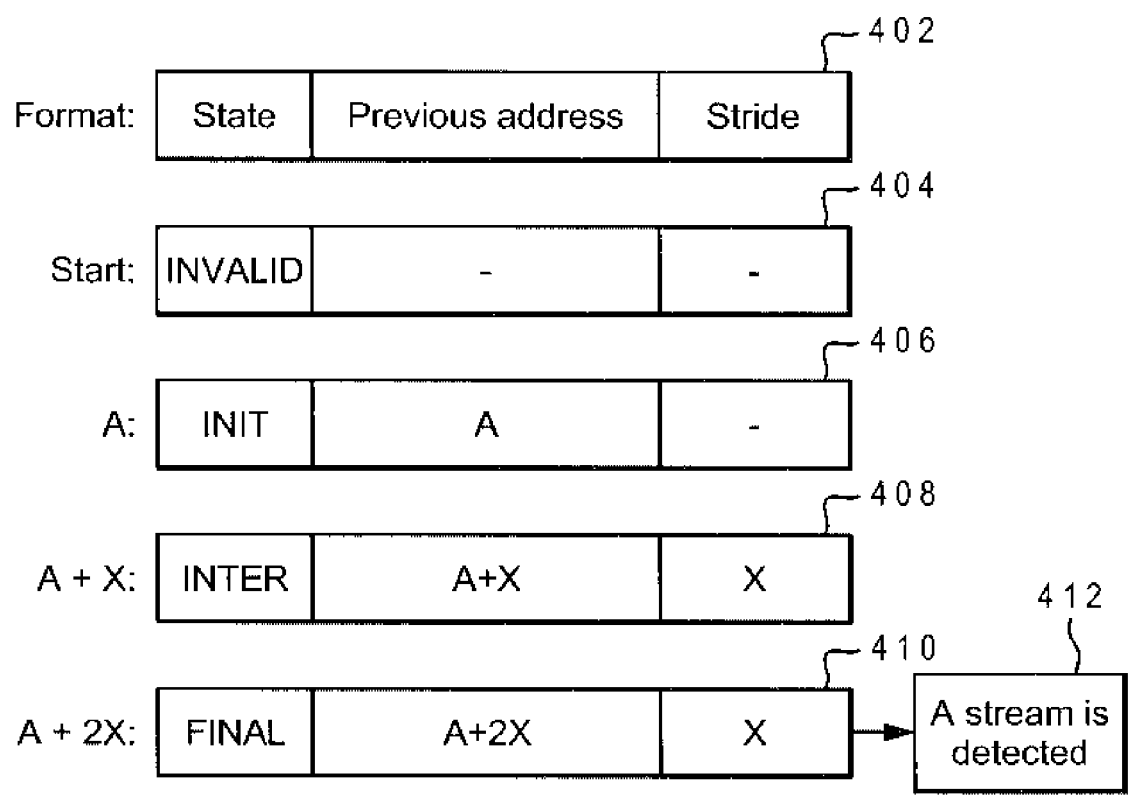
FIG. 4 illustrates a stride access detection scheme utilizing the multiple-table algorithm of stride pattern detection in accordance with one embodiment of the present invention.

FIG. 4 illustrates an example scheme by which a stride may be detected according to one embodiment of the invention. A first row 402 indicates the format for the entries within a register comprising three entries. The first entry describes the state of the register, the second tracks the previous address and the last indicates the stride pattern between the previous address and subsequent addresses. The state entry begins with register 404 in an invalid (INVALID) state, which is the condition prior to receiving any input or on start up/power on of the device. After receiving an address A, the state entry is changed to initial (INIT) state within register 406, and address A is filled in as the previous address. When a next address, A+X is received, the PE's logic computes the stride as the "current address minus the initial address", i.e., "A+X−A=X". The logic then fills in A+X as the previous address, changes the state to intermediate (INTER), and records X as the stride, all reflected within register 408. Finally, a third address, A+2X, is received, and the PE's logic again computes the stride as "new address minus previous address", i.e., "(A+2X)−(A+X)=X". The new address value and calculated stride are recorded within register 410. Then, the PE logic compares the stride within register 410 with that within register 408, and when the latter stride matches the previous stride in the register/entry, the logic determines a stream is detected. As a result, the PE logic initiates a stream with a stride of X and changes the state of register 410 to final (FINAL).

Figure 5:
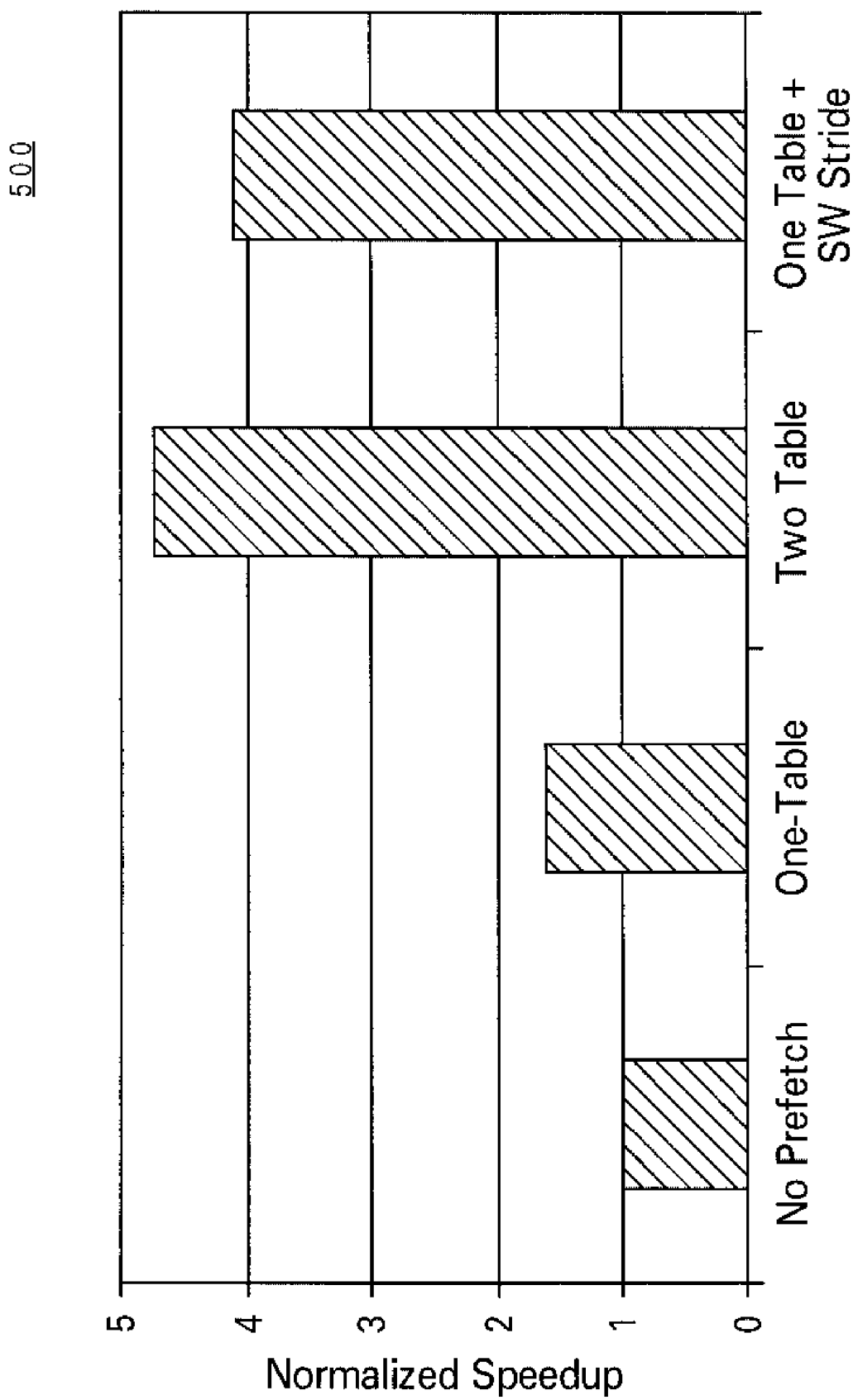
FIG. 5 is a graphical chart showing the execution speed comparison between conventional stream pattern detection with a single history table and the prefetching techniques utilizing multiple history tables on an application called PTRANS, in accordance with one embodiment of the present invention.

FIG. 5 illustrates a chart displaying the resulting effects on PTRANS, a matrix transpose program, when conducting a prefetch operation utilizing the mechanisms of the present invention as described above. Four plots are illustrated, each plotted against normalized speedup on the Y axis. These plots indicate that compared to a one-table prefetch the two table prefetch implementation for the present invention provided almost a two-thirds reduction in execution time. Compared to the one table implementation enhanced with software stride functionality, the hardware implemented methods of the present invention yielded improved characteristics. The "no prefetch" plot is not utilized in most conventional systems.

It is important to note that although the present invention has been described in the context of a data processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
a processor; a memory hierarchy coupled to the processor and having at least one lower level storage device; a prefetch engine (PE) associated with the processor and which includes: a plurality of history tables, each of which is utilized to track a set of different stride patterns for received requests; and logic for enabling simultaneous tracking of multiple different stride patterns for accessing the storage device using the plurality of history tables, wherein said plurality of history tables are ordered for sequential access based on a first check of simple stride patterns at a first history table and a second check of more complicated stride patterns at a second of subsequent history tables; said logic further comprises logic for: parsing a received address for a first index corresponding to the first history table, wherein a plurality of indices is provided within the received address and each index in the plurality of indices corresponds to a history table of the plurality of history tables; parsing the received address for subsequent indices; and enabling ordered access to said plurality of history tables using said indices, wherein said plurality of history tables are accessed in a preset order to reduce interference between the different stride patterns, wherein said logic for enabling ordered access further comprises logic for: determining at the first history table whether a received address fits a first stride pattern of the first history table; and when the address fits the first stride pattern of the first history table, identifying the address as belonging to a stream having that first stride pattern and initiating a prefetch stream and when an address does not fit the first stride pattern of the first history table, said logic further comprises logic for: forwarding the address to the second history table within the preset order of history tables, said second history table being next in sequence relative to said first history table; checking the second history table for a match of its second stride pattern to the address; and when no match of the second stride pattern is found at the second history table, iteratively forwarding the address to the next sequential history table(s) to be checked against the stride pattern(s) of the next sequential history table(s) until a last history table is reached within the preset order.

2. The data processing system of claim 1, wherein: said first history table, and each subsequent history table, is identified by the corresponding index within the plurality of indices; when the address does not fit the stride pattern of a current history table to which a current index corresponds, parsing the address for a next index corresponding to a next history table in the preset order; and when the address does not fit a stride pattern of the next history table, sequentially parsing said address for subsequent indices corresponding to subsequent history tables supported within the PE until either a last history table is checked or a match of the stride pattern is found for the address.

3. The data processing system of claim 1, wherein the PE includes a reference prediction unit and a prefetch request issue unit, said reference prediction unit further comprising:
at least one reference prediction table having associated therewith a reference/stream prediction logic, which predicts future references based on issued references; and
at least one active streams table, each active streams table providing one or more entries for active streams, wherein each of said at least one active streams table includes prefetch request issue logic, which sends out prefetch requests at calculated times;
wherein when a stream detection logic detects that the address is part of a stream within the first table, a prefetch stream is initiated and the address is not forwarded to the second table.

4. The data processing system of claim 1, wherein: said logic within said PE comprises logic for performing a two-table stride prediction algorithm, wherein a first "simple-pattern" history table is utilized to detect simple streams and a second "complicated-pattern" history table is utilized to detect other hard-to-detect streams; wherein said first table and said second table are organized as set-associative caches and indexed by corresponding sets of specific index bits of an address within a received request, wherein a respective value of each set of index bits determines how large a region to check for access stride patterns, and wherein using different bits enables the PE to look into small regions for simple stride patterns, such as unit and small non-unit strides and large regions for other strides, such as large strides and avoid interferences among small strides, and between small strides and large strides.

5. The data processing system of claim 1, wherein:
a set of index bits corresponds to a specific stride history table, and when said processor executes according to a big endian addressing scheme/configuration and said system includes two history tables, a large stride history table is indexed by more significant bits within an address while a smaller stride history table is indexed by less significant bits within the address; and
when the PE receives the address, said logic further comprises logic for:
first selecting a set of bits providing a smallest value index to index into a corresponding first table with a smallest stride;
accessing the corresponding first table having the smallest stride via the smallest value index; and
when the logic does not detect a stride within the corresponding first table, forwarding the address to a second table with a next highest value index and initiating a check of the second table to detect a larger stride, wherein a stride detected at the second table is larger than another stride detected at the first table.

6. The data processing system of claim 1, said logic further comprising logic for:
automatically determining a stride pattern associated with a received prefetch request having an address.

7. The data processing system of claim 6, wherein said logic for automatically determining a stride pattern comprises:
a stride evaluation component, said component having a plurality of registers each having at least three updatable entries utilized for analyzing a single stride pattern;
wherein a first entry provides a current state of a corresponding register, a second entry tracks a previous address received, and a third entry is utilized to store a stride pattern/length determined as the difference between the previous address and a subsequent address;
logic for storing a first address received as the previous address within, a first register;
logic for computing a first stride length by subtracting the previous address from a subsequently received second address and recording the first stride length within a third entry of a second register;
logic, when a third address is received, for computing a second stride length by subtracting the second address from the third address;
logic for comparing the second stride length with the first stride length; and
when the second stride length matches the first stride length, signaling detection of a presence of a stream and initiating a stream prefetch with a stride pattern equivalent to one of the second and the first stride lengths.

8. A method for enabling a prefetch engine (PE) to detect and support hardware prefetching with streams of different stride patterns in accesses, said method comprising: providing a plurality of history tables associated with the PE, wherein each of the plurality of history tables are utilized to detect different stride patterns; providing a separate index for each of the plurality of history tables within an address of a prefetch request, wherein each of said separate index is provided by a different set of bits of the address; dynamically determining a stride pattern of a received prefetch request via ordered access to one or more of said plurality of history tables, wherein said plurality of history tables are accessed in a preset sequential order to reduce interference between different stride patterns; and enabling simultaneous tracking of multiple different stride patterns for accessing a lower level storage device via the plurality of history tables, wherein said dynamically determining a stride pattern further comprises: accessing a first history table among the plurality of history tables to determine whether the address fits a stride pattern of the first history table; and when the address fits the stride pattern of the first history table, identifying the address as belonging to a stream and initiating a corresponding prefetch stream; when the stride pattern does not fit that of the first history table; forwarding the address to a next sequential history table within the preset order; checking the next sequential table for a match of its stride pattern to the address; and when the stride pattern of the next sequential table does not match the address, iteratively forwarding the address to the next sequential table(s) to be checked against the stride pattern of each table in sequence until a last table is reached within the preset order.

9. The method of claim 8, wherein the index for each of the plurality of history tables is derived from sets of bits within the address of the prefetch request, said method further comprising: parsing the address of the prefetch request for a first index corresponding to a first history table; and when the address of the prefetch request does not fit a stride pattern of the first history table to which the first index corresponds, parsing the address of the prefetch request for a second index corresponding to a second history table; and when the address of the prefetch request does not fit a stride pattern of the second history table, sequentially parsing said address of the prefetch request for subsequent indices corresponding to subsequent history tables supported within the PE until either a last history table is checked or a match of a stride pattern is found for the address of the prefetch request.

10. The method of claim 8, wherein: said plurality of history tables are ordered for sequential access based on a check of unit and small stride patterns at a first history table and larger stride patterns at subsequent history tables in the preset sequential order, wherein each history table is accessed via an associated index found within a prefetch address, such that said PE simultaneously supports multiple stride patterns; and said method further comprises: parsing the prefetch address for a first index corresponding to the first history table, wherein an index for each of the plurality of history tables is provided by a different set of bits within the prefetch address, and multiple indices are provided within the prefetch address each corresponding to one of the plurality of history tables; and enabling ordered access to said plurality of history tables utilizing said indices, wherein said plurality of history tables are accessed in a preset order to substantially eliminate interference between the multiple different stride patterns.

11. The method of claim 8, wherein: logic is provided within said PE for performing a two-table stride prediction algorithm, wherein a first "small stride" history table is utilized to detect unit and small, non-unit stride streams and a second "large stride" history table is utilized to detect large, non-unit stride streams; wherein said first table and said second table are organized as set-associative caches and indexed by specific bits of an address within a prefetch request, wherein a respective value of each set of index bits determines how large a region to check for stride patterns, and wherein using different bits enables the PE to look into small regions for unit and small non-unit strides and large regions for large strides and avoid an interferences among small strides, and between small strides and large strides.

12. The method of claim 8, wherein:
each set of index bits correspond to a specific stride history table, and when said processor executes according to a big endian addressing scheme/configuration and said system includes two history tables, a large stride history table (second table) is indexed by more significant bits within the address while a smaller stride history table (first table) is indexed by less significant bits within the address; and
when the PE receives an address, said method further comprises:
first selecting a set of bits providing a smallest value index to index into the first table with a smallest stride;
accessing the first table having the smallest stride via the smallest value index; and
when the PE does not detect a stride within the first table, forwarding the address to the second table with a next highest value index and initiating a check of the second table to detect a larger stride, wherein a stride detected at the second table is larger than another stride detected at the first table.

13. The method of claim 8, further comprising:
automatically determining a stride pattern associated with a received prefetch request having an address, wherein said automatically determining a stride pattern utilizes a stride evaluation component, said component having a plurality of registers each having at least three updatable entries utilized for analyzing a single stride pattern, wherein a first entry provides a current state of the corresponding register, a second entry tracks a previous address received, and a third entry is utilized to store a stride pattern/length determined as the difference between the previous address and a subsequent address;

storing a first address received as the previous address within a first register;

computing a first stride length by subtracting the previous address from a subsequently received second address and recording the first stride length within the third entry of a second register;

when a third address is received, computing a second stride length by subtracting the second address from the third address;

comparing the second stride length with the first stride length; and when the second stride length matches the first stride length, signaling detection of a presence of a stream and initiating a stream prefetch with a stride pattern equivalent to one of the second and the first stride lengths.

14. A computer program product comprising a computer recordable medium and program code stored on the computer recordable medium that when executed provides the functions of claim 13.

15. A computer program product comprising a computer recordable medium and program code stored on the computer recordable medium that when executed provides the functions of claim 8.

* * * * *

UNITED STATES PATENT AND TRADEMARK OFFICE
CERTIFICATE OF CORRECTION

PATENT NO. : 7,657,729 B2  Page 1 of 1
APPLICATION NO. : 11/457178
DATED : February 2, 2010
INVENTOR(S) : El-Essawy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 312 days.

Signed and Sealed this

Thirtieth Day of November, 2010

David J. Kappos
*Director of the United States Patent and Trademark Office*